United States Patent
Muncy et al.

(10) Patent No.: US 10,640,328 B2
(45) Date of Patent: May 5, 2020

(54) SYSTEM FOR COMPILING AND TRANSFERRING ELEVATOR CONFIGURATION DATA AND METHODS OF USING SAME

(71) Applicants: ThyssenKrupp Elevator AG, Essen (DE); thyssenkrupp AG, Essen (DE)

(72) Inventors: Matthew Muncy, Germantown, TN (US); Sean Luis Stecker, Marietta, GA (US); Chih-Hung Aaron King, Sharpsburg, GA (US)

(73) Assignees: THYSSENKRUPP ELEVATOR AG, Essen (DE); THYSSENKRUPP AG, Essen (DE)

( * ) Notice: Subject to any disclaimer, the term of this patent is extended or adjusted under 35 U.S.C. 154(b) by 39 days.

(21) Appl. No.: 15/840,843

(22) Filed: Dec. 13, 2017

(65) Prior Publication Data
US 2019/0177116 A1   Jun. 13, 2019

(51) Int. Cl.
| | |
|---|---|
| *G06F 9/44* | (2018.01) |
| *B66B 1/34* | (2006.01) |
| *G05B 23/02* | (2006.01) |
| *B66B 19/00* | (2006.01) |
| *G05B 15/02* | (2006.01) |

(Continued)

(52) U.S. Cl.
CPC ......... *B66B 1/3453* (2013.01); *B66B 1/3407* (2013.01); *B66B 19/00* (2013.01); *G05B 15/02* (2013.01); *G05B 19/0426* (2013.01); *G05B 23/0221* (2013.01); *G05B 23/0272* (2013.01); *G08B 21/18* (2013.01)

(58) Field of Classification Search
CPC ............................ B66B 1/3453; B66B 1/3446

USPC ........................... 717/168–175; 700/231–264
See application file for complete search history.

(56) References Cited

U.S. PATENT DOCUMENTS

| | | | | |
|---|---|---|---|---|
| 4,690,243 A | * | 9/1987 | Ichioka | ..................... B66B 1/34 187/247 |
| 5,352,857 A | * | 10/1994 | Ovaska | ..................... B66B 1/18 187/247 |

(Continued)

FOREIGN PATENT DOCUMENTS

WO        2013130032 A1      9/2013

OTHER PUBLICATIONS

Munoz et al, "Implementation of Dispatching Algorithms for Elevator Systems using Reconfigurable Architectures", ACM, pp. 32-37 (Year: 2006).*

(Continued)

*Primary Examiner* — Anil Khatri
(74) *Attorney, Agent, or Firm* — Lathrop GPM LLP (57) ABSTRACT

A computer-implemented method for importing data to an elevator content control system comprises using a computing structure remote from a destination dispatch kiosk to select a location to upload a configuration data file. The configuration data file includes building information and elevator information. The method comprises uploading the selected configuration data file to the content control system. The method includes importing the configuration data file to the content control system to fill in a void in a second configuration data file. The importing does not overwrite a preset identification number for at least one of an elevator, a kiosk, an elevator controller, a building, a job, and an elevator car.

20 Claims, 6 Drawing Sheets

(51) Int. Cl.
*G05B 19/042* (2006.01)
*G08B 21/18* (2006.01)

(56) References Cited

U.S. PATENT DOCUMENTS

| | | | | | |
|---|---|---|---|---|---|
| 6,078,848 | A * | 6/2000 | Bernstein | ............... | G06Q 20/18 |
| | | | | | 700/233 |
| 6,331,867 | B1 * | 12/2001 | Eberhard | ............... | G06F 3/0485 |
| | | | | | 715/864 |
| 6,487,717 | B1 * | 11/2002 | Brunemann | ............... | G06F 8/65 |
| | | | | | 701/31.5 |
| 6,615,175 | B1 * | 9/2003 | Gazdzinski | ............... | B66B 1/34 |
| | | | | | 187/396 |
| 6,854,112 | B2 * | 2/2005 | Crespo | ............... | G06F 8/61 |
| | | | | | 707/999.202 |
| 7,093,003 | B2 * | 8/2006 | Yuh | ............... | G06F 8/65 |
| | | | | | 709/219 |
| 7,380,120 | B1 * | 5/2008 | Garcia | ............... | G06F 21/6209 |
| | | | | | 713/160 |
| 7,587,250 | B2 * | 9/2009 | Coogan | ............... | G05B 19/042 |
| | | | | | 700/17 |
| 7,890,755 | B2 * | 2/2011 | Schnackenberg | ....... | G06F 21/57 |
| | | | | | 709/220 |
| 8,051,028 | B2 * | 11/2011 | Karnik | ............... | G06F 9/44505 |
| | | | | | 706/48 |
| 8,087,013 | B2 * | 12/2011 | Kelly | ............... | G06F 8/65 |
| | | | | | 706/47 |
| 8,555,273 | B1 * | 10/2013 | Chia | ............... | G06F 8/654 |
| | | | | | 717/173 |
| 8,578,365 | B2 * | 11/2013 | Hnida | ............... | H04L 67/06 |
| | | | | | 717/169 |
| 8,578,658 | B2 * | 11/2013 | Snell | ............... | E04D 13/076 |
| | | | | | 210/474 |
| 8,751,707 | B2 * | 6/2014 | Moench | ............... | G06F 9/445 |
| | | | | | 710/63 |
| 8,776,038 | B2 * | 7/2014 | Larimore | ............... | G06F 16/188 |
| | | | | | 717/168 |
| 8,914,794 | B2 * | 12/2014 | Bliss | ............... | G06F 8/63 |
| | | | | | 717/101 |
| 8,955,038 | B2 * | 2/2015 | Nicodemus | ......... | G06F 11/3495 |
| | | | | | 726/1 |
| 2013/0116835 | A1 | 5/2013 | Nowel | | |

OTHER PUBLICATIONS

Yu et al, "A Double-Deck Elevator System Controller with Idle Cage Assignment Algorithm Using Genetic Network Programming", ACM, pp. 1313-1314 (Year: 2010).*
Dong et al, "Data Elevator: Low-contention Data Movement in Hierarchical Storage System", IEEE, pp. 152-161 (Year: 2016).*
Turunen et al "Mobile Interaction with Elevators—Improving People Flow in Complex Buildings", ACM, pp. 43-50 (Year: 2013).*
Hicks et al, "Dynamic Software Updating", ACM, pp. 1049-1096 (Year: 2005).*
Wong et al, "Utilizing Elevator for Wireless Sensor Data Collection in High-Rise Structure Monitoring", IEEE, pp. 1-9 (Year: 2011).*

* cited by examiner

SYSTEM FOR COMPILING AND TRANSFERRING ELEVATOR CONFIGURATION DATA AND METHODS OF USING SAME

FIELD OF THE DISCLOSURE

The disclosure relates generally to the field of elevator content control systems. More specifically, the disclosure relates to importing and exporting building and elevator configuration data via elevator content control systems.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a non-transitory computer readable medium with computer executable instructions stored thereon executed by a digital processor to perform the method of importing data to a content control system comprises: (a) instructions for selecting a location to upload a configuration data file containing building information and elevator information; (b) instructions for uploading the configuration data file from the location to the content control system; and (c) instructions for importing the configuration data file to the content control system to fill in a void in a second configuration data file. The importing does not overwrite a preset identification number for at least one of an elevator, a kiosk, an elevator controller, a building, a job, and an elevator car.

According to another embodiment, a computer-implemented method for importing data to an elevator content control system comprises using a computing structure remote from a destination dispatch kiosk to select a location to upload a configuration data file. The configuration data file includes building information and elevator information. The method comprises uploading the selected configuration data file to the content control system. The method includes importing the configuration data file to the content control system to fill in a void in a second configuration data file. The importing does not overwrite a preset identification number for at least one of an elevator, a kiosk, an elevator controller, a building, a job, and an elevator car.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Elevators, which were once installed in a select few buildings, have now become ubiquitous. According to the National Elevator Industry, Inc., there are about a million elevators in the United States alone, which are collectively used about eighteen billion times a year to transport one or more passengers from one floor to another. Each elevator may include an elevator interface, which is typically provided inside the elevator (e.g., adjacent the door thereof). A passenger may enter an elevator and employ the interface to select his or her destination floor. An elevator controller in data communication with the elevator interface may subsequently cause the elevator to travel to the floor selected by the passenger.

Some buildings may include an elevator bank comprising two or more elevators. When a passenger calls an elevator, e.g., to the lobby of a building, the closest elevator may be assigned to the call. Once the elevator reaches the lobby, all the passengers waiting for an elevator in the lobby may attempt to board the elevator, until, e.g., the elevator is full. Such may be operationally inefficient. Some of the passengers aboard the elevator may be headed to lower floors, whereas other passengers aboard the elevator may be headed to higher floors. The elevator may consequently make many stops, which may needlessly increase the average time it takes for a passenger to reach his or her desired floor.

Elevator destination dispatch (DD) systems (e.g., kiosks) have recently been introduced to address this problem. The destination dispatch kiosks are conventionally located outside the elevator to allow each passenger to indicate his or her destination floor (or other location) before boarding an elevator. Each destination dispatch kiosk may include or have associated therewith an elevator control having a processor and a memory housing algorithms directed generally to minimizing the average time it takes for passengers to reach their respective destination floors via the elevators. For example, as is known, the kiosk may facilitate grouping of elevators' passengers based on their destination floors.

Each destination dispatch kiosk may include input device (s) (e.g., input keys, buttons, switches, etc.) and output devices(s) (e.g., a display, a speaker, a warning light, etc.). The functionality of at least some of the input and output devices may be combined (e.g., as a touchscreen). The touchscreen may display, among other content, a plurality of floor buttons, each of which may be associated with a particular destination floor. A passenger wishing to board an elevator may interact with (e.g., press) a floor button on the destination dispatch kiosk touchscreen to indicate his or her desired destination floor, and the kiosk may use this input to call an elevator for the passenger. The kiosk may then employ the touchscreen to identify the particular elevator (which may be the next elevator to arrive at the passenger's floor or a different elevator) the passenger should take to reach his or her destination floor.

The content (e.g., the floor buttons) displayed on an output (such as a touchscreen or other display) of a destination dispatch kiosk located at one floor of a building may be different from the content displayed on an output of a destination dispatch kiosk located at another floor of that building and/or from the content displayed on an output of a destination dispatch kiosk located in another building. A content control system may control the content displayed on a destination dispatch kiosk. The content control system may also allow for the programming and updating of the elevator controller.

The number of floors, elevators, destination dispatch kiosks, etc., in two different buildings may be different. In the prior art, each destination dispatch kiosk in each floor of each building must be individually programmed, typically via manual entry of the information associated with that kiosk. The prior art methods to generate and configure content for destination dispatch kiosks (e.g., each destination kiosk on each floor of a building) are generally time consuming and laborious. The prior art methods are also error prone as the risk of introducing errors during the data entry process is high. Reconfiguration of the destination dispatch kiosks is likewise costly and inefficient. It may be desirable for a content control system to import building information directly from the elevator controller, so that this building information can then be transported and replicated as needed by other content control systems.

Figure 1:
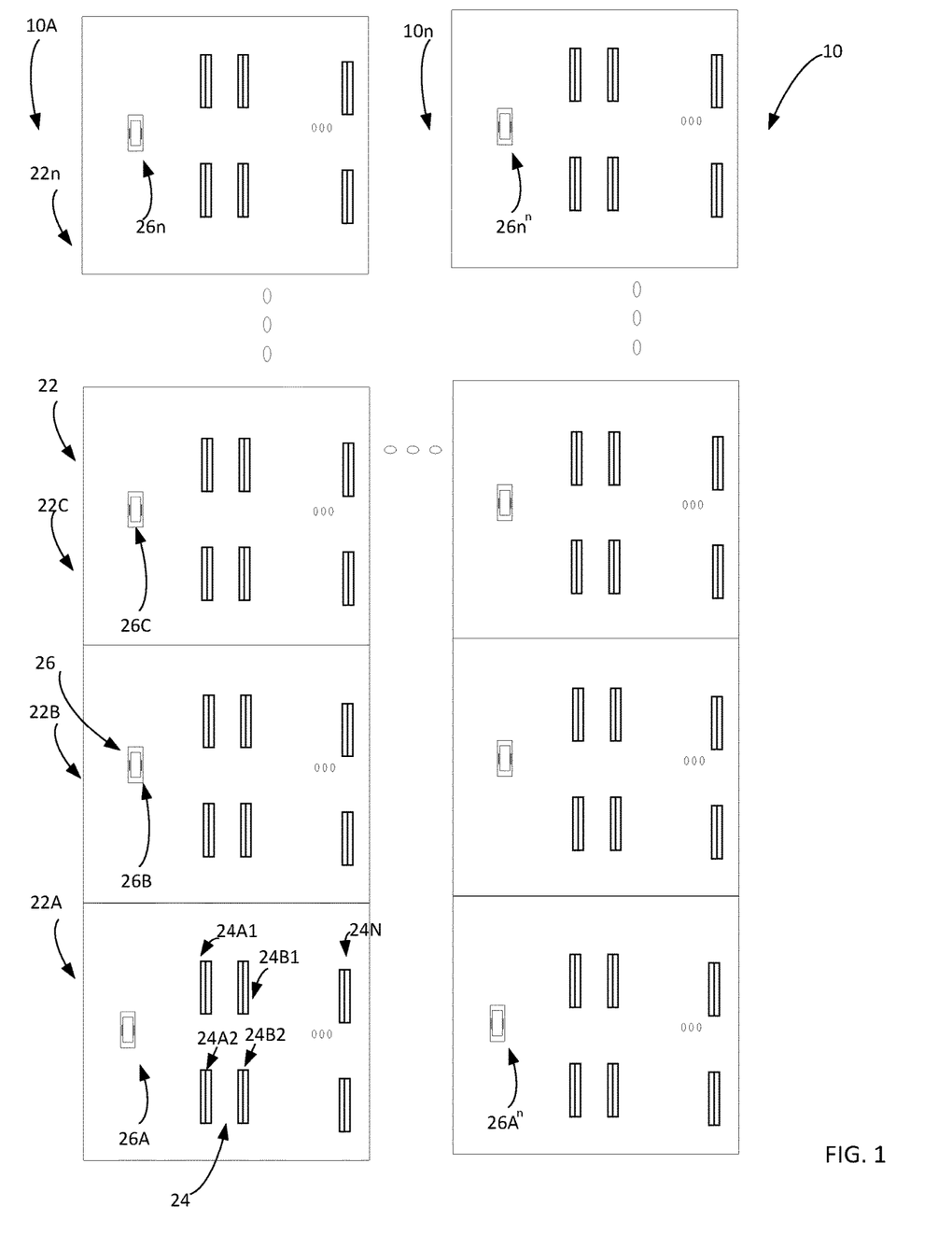
FIG. 1 is a schematic representation of a building having a plurality of elevator destination dispatch kiosks.

Attention is directed now to FIG. 1, which shows example multi-story buildings 10 (e.g., 10A-10$n$) each having floors 22 (e.g., floors 22A-22$n$) and elevators 24 (e.g., elevators 24A-24$n$). Each floor 22 may include a separate destination dispatch kiosk 26 (e.g., one or more of destination dispatch kiosks 26A-26$n$) that is located outside the elevator doors to allow a passenger to indicate his or her destination floor prior to boarding an elevator. Building 10$n$ may be related to building 10A (e.g., may be in the same geographical area or complex) or may be unrelated thereto. Building 10$n$ may likewise have floors, elevators, and kiosks (e.g., kiosks 26A'' to 26$n$'') on each floor. While FIG. 1 shows that each floor 22 has one destination dispatch kiosk 26 associated therewith, the artisan will understand that certain floors 22 may not include any destination dispatch kiosks 26 and that other floors 22 (e.g., the building lobby) may include two or more destination dispatch kiosks 26.

Figure 2:
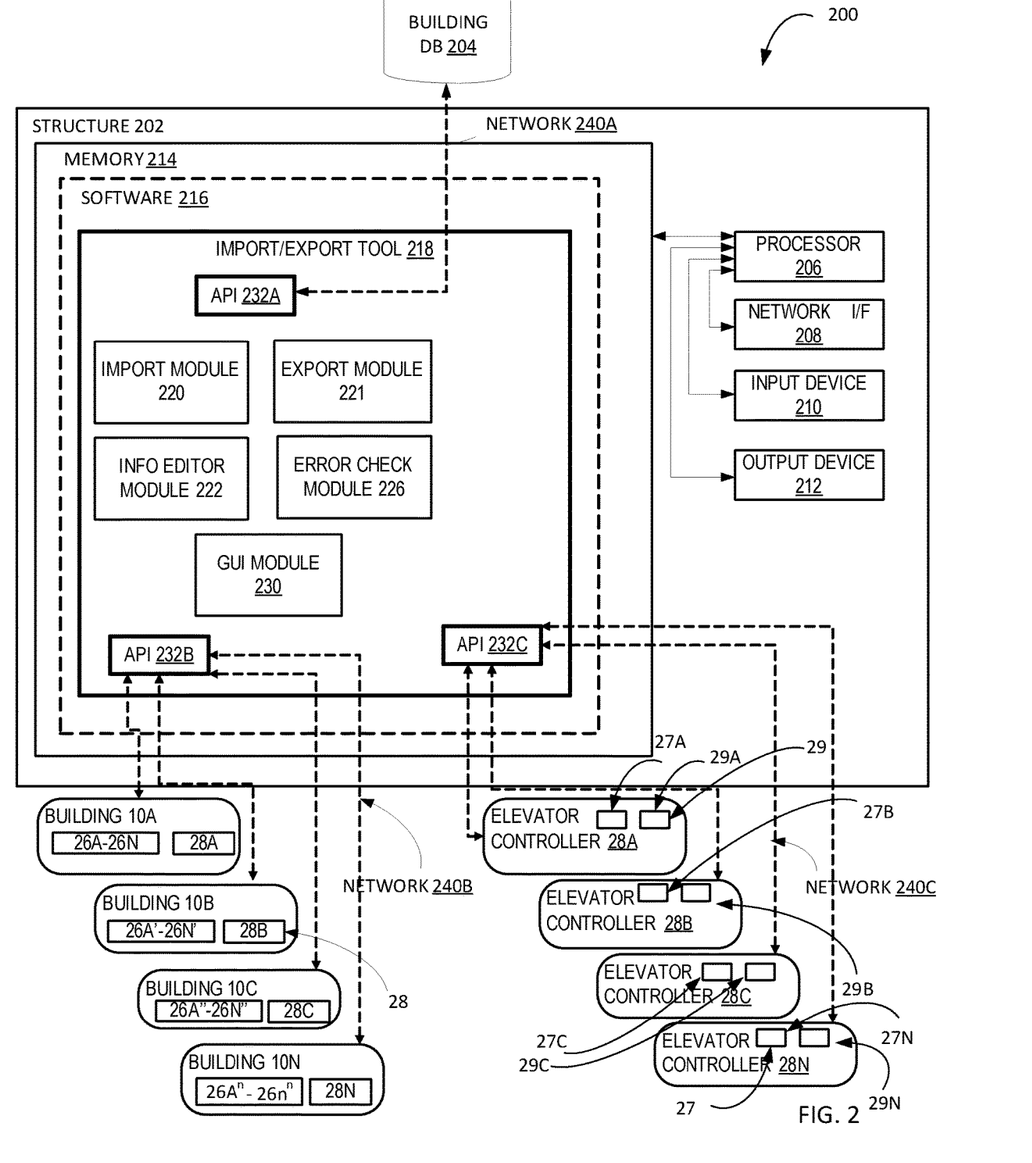
FIG. 2 is a schematic illustrating a system having an import/export tool for importing and exporting elevator configurations for destination dispatch kiosks of FIG. 1, according to an embodiment.

FIG. 2 shows a content control system 200 for importing, exporting and/or transferring data, such as building information 27 and elevator data 29, according to an example embodiment. The system 200 may include a structure 202 communicatively coupled to buildings 10 (e.g., buildings 10A-10$n$, including destination dispatch kiosk 26 (e.g., kiosks 26A, 26B, 26C, 26$n$, 26$n$'', etc. thereof)), elevator controllers 28 (e.g. elevator controllers 28A through 28$n$), and a building database 204. The structure 202 may be a computing device, such as a desktop computer, a laptop computer, a smart phone, a tablet, a web or other server, etc. In embodiments, the structure 202 may be a dedicated computing device adapted to generate and configure content for the destination dispatch kiosks 26 in line with the teachings of the present disclosure.

The structure 202 may include a processor 206, which may be in data communication with a network interface 208, an input device 210, an output device 212, and a memory 214. The processor 206 represents one or more digital processors. Network interface 208 may be implemented as one or both of a wired network interface and a wireless network interface, as is known in the art. The input device 210 may include a keyboard, a mouse, a stylus pen, buttons, knobs, switches, and/or any other device that may allow a user to provide an input to the system 200 via the structure 202. In some embodiments, the input device 210 may comprise a media port (such as a USB port or a SD or microSD port) to allow for media (e.g., a USB drive, a SD or micro SD drive, a laptop memory, a smart phone memory, etc.) to be communicatively coupled to the structure 202. The output device 212 may include one or more visual indicators (e.g., a display), audible indicators (e.g., speakers), or any other such output device now known or subsequently developed. In some embodiments, at least a part of the input device 210 and the output device 212 may be combined. A user may functionally interact with the system 200, including the kiosk 26 thereof, using the input device 210 and the output device 212.

Memory 214 represents one or more of volatile memory (e.g., RAM) and non-volatile memory (e.g., ROM, FLASH, magnetic media, optical media, etc.). Although shown within the structure 202, memory 214 may be, at least in part, implemented as network storage that is external to the structure 202 and accessed via the network interface 208. The memory 214 may house software 216, which may be stored in a transitory or non-transitory portion of the memory 214. Software 216 includes machine readable instructions that are executed by processor 206 to perform the functionality described herein. In some example embodiments, the processor 206 may be configured through particularly configured hardware, such as an application specific integrated circuit (ASIC), field-programmable gate array (FPGA), etc., and/or through execution of software (e.g., software 216) to perform functions in accordance with the disclosure herein.

The software 216 may include an import/export tool 218. The import/export tool 218 may, in embodiments, be an "application", such as a mobile application configured for an Android, Apple, or other device, a computer application configured for a desktop or mobile computer, etc. Alternately or additionally, in some embodiments, the import/export tool 218 may be accessible over a network (e.g., over the internet via a password protected or other website, over an intranet, etc.). The import/export tool 218 may include one or more of the following: an import module 220, an export module 221, information editor module 222, an error check module 226, a graphical user interface (GUI) module 230, and Application Programming Interfaces ("API") 232A, 232B, 232C, each of which are described in more detail herein. A module may be a portion of a computer program and comprise instructions to perform a particular function.

The structure 202, via the API 232A, may selectively communicate over a network 240A with a building database 204. The building database 204 may be a storage medium, such as an optical hard drive storing building and elevator information (e.g., building and elevator data 27 and 29, respectively, from elevator controller 28). The building database 204 may be in communication with or be a part of a design center, where the layout of the destination dispatch kiosks 26A-26$n$ may be developed. The structure 202, via the API 232B, may likewise communicate over a network 240B with buildings 10A-10N that include the destination dispatch kiosks 26A-26$n$. The structure 202, via the API 232C, may also communicate over a network 240C with individual elevator controllers 28A-28$n$ of individual buildings. Each of the networks 240A, 240B, and 240C may be wired or wireless, and in embodiments, may be the same network. As discussed herein, the import/export tool 218 may be used to import the building configuration data of one building, including the data relating to the elevators and walking layout configurations for each destination dispatch kiosk (e.g., kiosks 26A-26N) in that building, among other building information, to automatically configure the elevators (e.g., elevator controllers) in another building.

Figure 3:
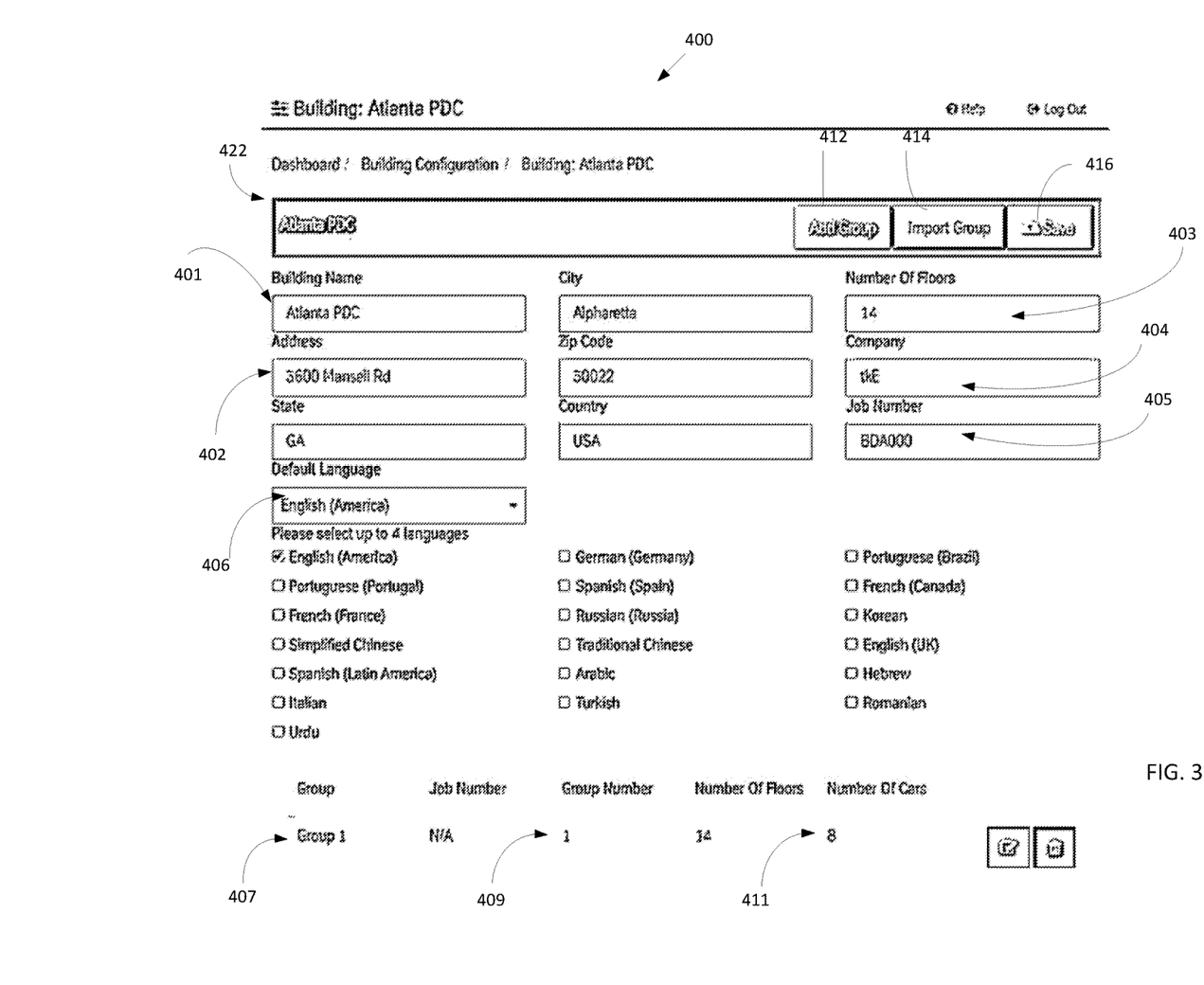
FIG. 3 is a schematic illustrating an information editor interface of the import/export tool of FIG. 2.
Figure 4:
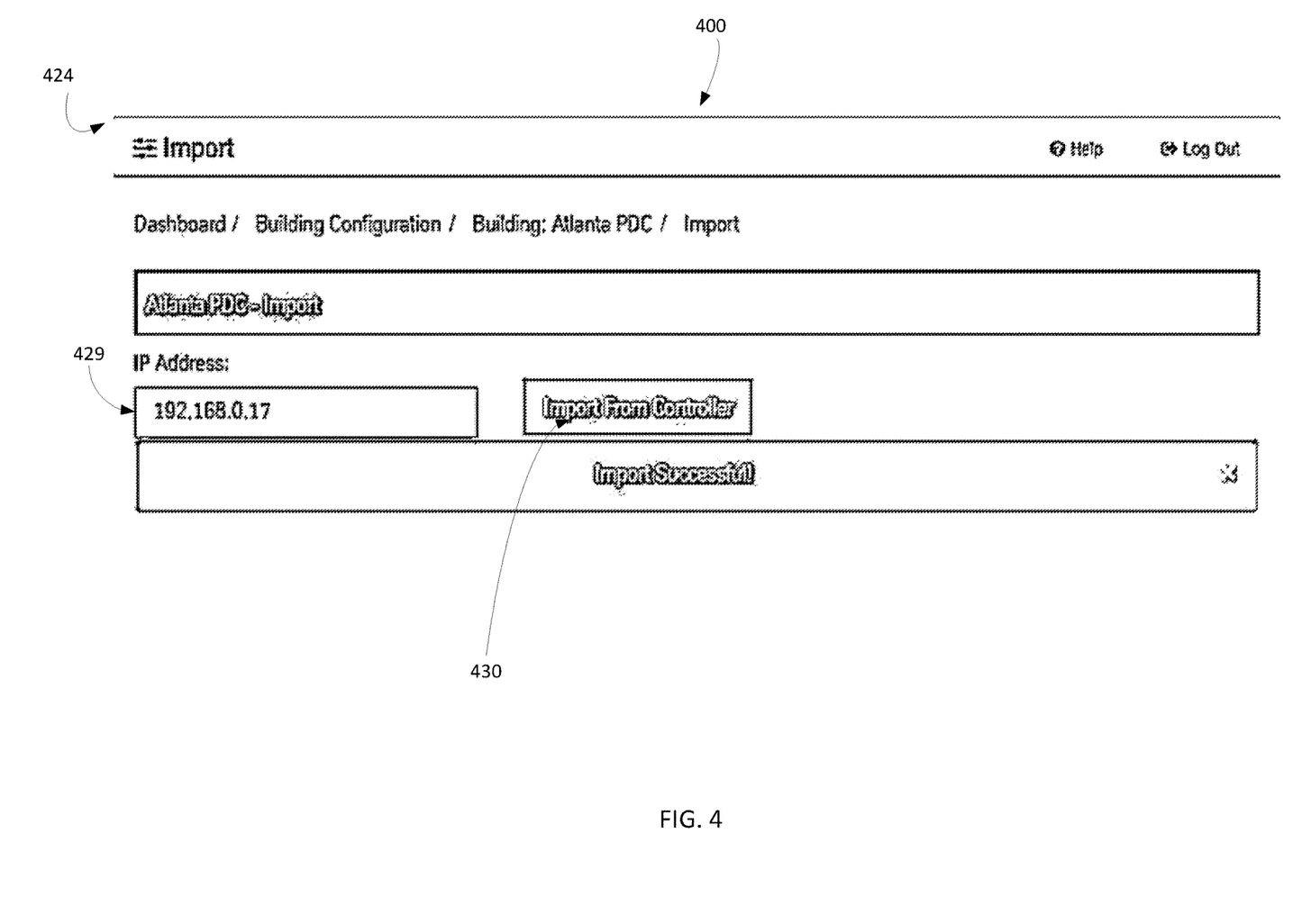
FIG. 4 is a schematic illustrating an information editor interface of the import/export tool of FIG. 2.
Figure 5:
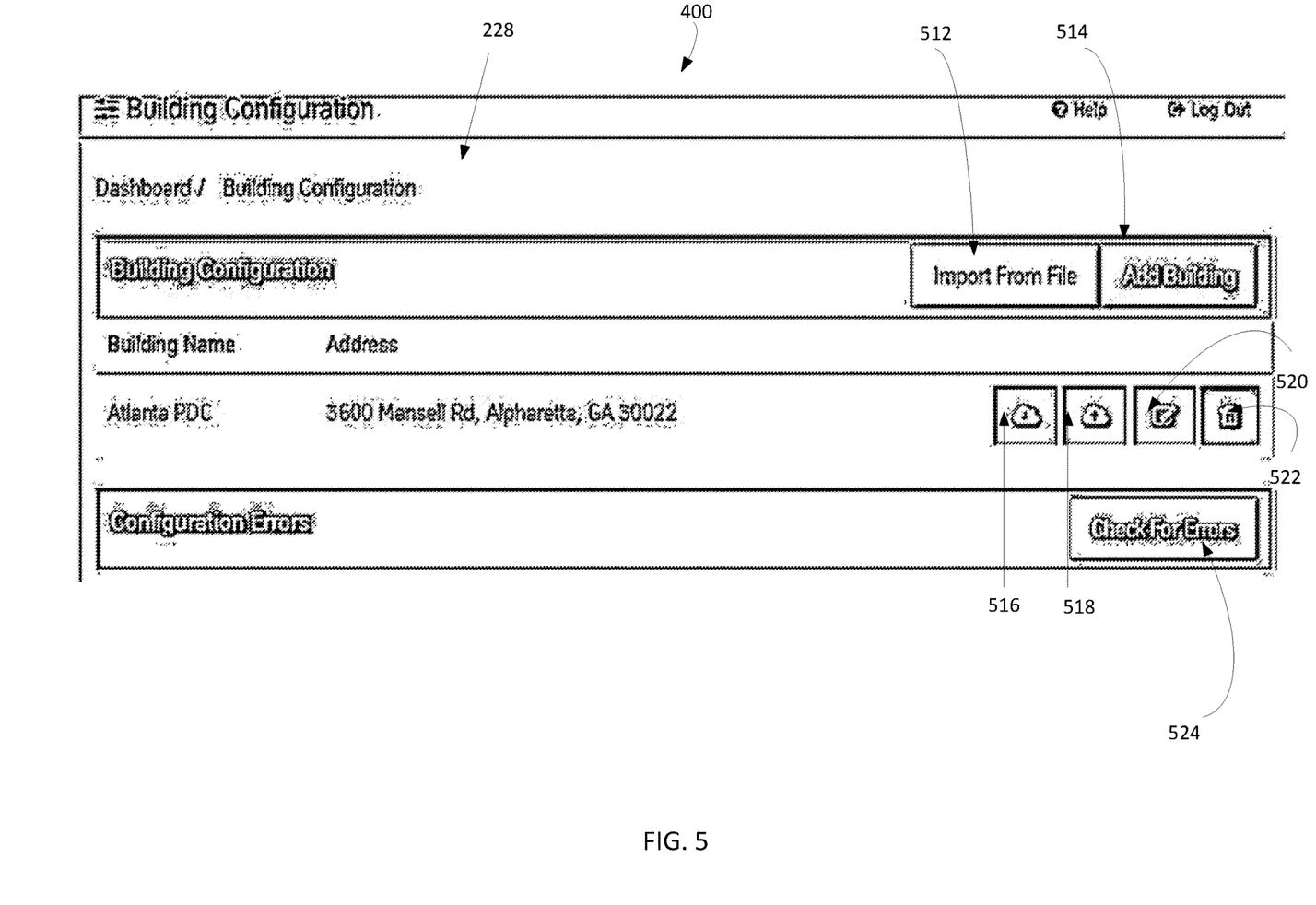
FIG. 5 is a schematic illustrating an information editor interface of the import/export tool of FIG. 2.

Methods of automatically importing and exporting building configurations are now described with reference to FIGS. 3-5. FIGS. 3-5 illustrate an example graphical user interface 400 of the import/export tool 218 generated by the GUI module 230 (FIG. 2), according to an example embodiment. A user (e.g., an elevator operator, an owner, landlord, or tenant of the building in which the kiosk 26 is located, etc.) may interact with the import/export tool 218 via the interface 400 and the input and output devices 210, 212, respectively. The import/export tool 218 may in-turn configure a building elevator controller or controllers and the kiosks in communication with these elevator controller(s).

In embodiments, the graphical user interface 400 of the import/export tool 218 may include an information editor area 422 for inputting information about the building (e.g., building 10A). For example, in an embodiment the information editor area 422 may allow for inputting: building name 401, location of building 402, number of floors in building 403, company name 404, job number 405, default language 406, group name 407, group number 409, number of elevator cars 411, etc. (e.g., a drop down menu, scroll bars, boxes, and the like may be provided for the inputting of this information). As outlined below, GUI input buttons 412, 414, and 416 may allow the user to further interact with the graphical user interface 400. In embodiments, entry and/or generation of information in the information editor area 422 of the interface 400 may be facilitated by the information editor module 222 (FIG. 2). The artisan will understand that the actual information shown in FIG. 3, and the types thereof, is merely exemplary and is not intended to be independently limiting.

In embodiments, control (e.g., clickable) buttons may be disposed proximate the information editor area 422. Example buttons may include an "add group" button 412, an "import group" button 414, and a "save" button 416. The add group button 412 may allow the user to manually input building information. For example, in embodiments, the user may click on the add group button 412 and manually input elevator configuration data for the number of floors that the building has (i.e. for each DD kiosk thereof). The information in the information editor area 422 may be saved in memory (e.g., memory 214) by using (e.g., clicking on) the save button 416.

The import group button 414 may allow the user to receive a building configuration from another content control system (not shown), building 10, elevator controller 28, or database 204, as discussed herein. Further, the user may click on the import group button 414, and in response thereto, a real time communication interface area 424 (FIG. 4) may pop-up to initiate the API 232C. The pop-up real time communication interface area 424 may be overlaid on top of the information editor area 422 or a portion thereof. The example real time communication interface area 424 (FIG. 4) may be generated by the GUI module 230 (FIG. 2).

The content control system 200 may use the import module 220 and certain identifying information to communicate directly with elevator controllers 28 (e.g., with the controller 28A, see FIG. 2). The content control system 200 may also indirectly communicate with one or more elevator controllers (e.g., elevator controllers 28A and 28n) via interfacing with the building (e.g., a smart building 10A through 10n). Further, the system 200 may use certain identifying information to directly or indirectly communicate with other content control systems across multiple building sites. The identifying information may comprise, e.g., an identification number of the building, control system, and/or elevator controller with whom the content control system 200 is to communicate. In an embodiment, the identification number may include an internet protocol (IP) address. Alternately, the identifying information may be, for example, a preset elevator job-configuration number in the database 204.

The elevator controller (e.g., controller 28A) may contain information about the elevators 24 (e.g., data 27 regarding the elevator features and functionality, for example). The elevator controller (e.g., controller 28A) may also contain information about the buildings (e.g., building 10A) within which the elevators are housed (e.g., building information 29 outlining the name, theme, logo, sounds, displays, walking distance, walking time, or the like). The elevator data 27 may include, for example, floor information (e.g., floor number, floor label, etc.), elevator car information (e.g. number of elevator cars, their grouping, car door orientation, etc.), lobby floor information (including alternate lobby floor information), controller protocol information, kiosk information (e.g., kiosk floor, kiosk location on map/floorplan, kiosk orientation, kiosk ID, kiosk button layout, kiosk language, kiosk model, screen size, etc.), information about special features (ADA, VIP, Service, Code Blue, etc.), information about global protocols (e.g. information outlining how the floor information for kiosks is organized by country or region), networking information (e.g., IP Addresses, subnet masks and default gateway addresses for UDP addressing for communication over Ethernet), etc. The building data 29 may include the job number, building name, building group, address, company, etc. Elevator data 27 and building information 29 may collectively be referred to herein as configuration data or configuration data file.

The real time communication area 424 may be employed to import the configuration data from the database 204, the elevator controllers (e.g., controller 28), and/or the buildings (e.g., building 10). In some embodiments, the configuration data in the data files initially imported via the real time communication area 424 may be adjusted, using e.g., an adjustment file, to account for the differences between one building (e.g., building 10A) to the next (e.g., building 10n).

Once the elevator controller ID or IP address 429 has been identified to or by the system 200, the user may click an "import from controller" button 430, and the content control system 200 may send a request signal to the elevator controller (e.g., elevator controller 28A) by means of the API 232C. After the controller 28 receives this request signal, the controller 28 generates the configuration data file and transmits this file to the content control system 200. The configuration data file may be encrypted. It is foreseen that there may be a feature indicating progress of transfer of the configuration data file and/or whether the file transfer is successful or failed. The configuration data file contains elevator and building information 27 and 29, respectively, and is translated into a data structure, such as a .zip file. The configuration data file may also be translated to digital data based on a markup language format (e.g. .xml, .json, .asn, .gml, and the like) and then imported to the content control system 200.

Referring now to FIG. 5, the graphical user interface 400 of the import/export tool 218 may include a data transfer area 228. The data transfer area 228 has GUI input buttons 512, 514, 516, 518, 520, 522, and 524 that may allow the user to further interact with the graphic user interface 400 of the data transfer area 228 as discussed below. The interaction with the data transfer area 228 may initiate one or more of modules 220, 221, and 226 (FIG. 2).

The content control system 200 may be used to selectively transfer data (e.g., transfer some or all of the configuration data) between buildings (e.g., from building 10A to 10B). For example, once the content control system 200 receives the configuration data file of one building (e.g., building 10A), the import module 220 may translate (e.g., decompress) same upon the user activating the "import from file" button 512. The configuration data file thus uploaded from building 10A may ultimately be selectively transferred to building 10B. More specifically, if the content control system 200 includes the building data 29B from building 10B but does not include the elevator data 27B from the building 10B, the import module 220 may import into the content control system 200 (for subsequent transfer to building 10B) only the elevator data 27A.

The content control system 200, e.g., the import module 220 thereof, may be a smart module. For example, in some embodiments, the import module 220 may import only those portions of the configuration data file of building 10A that are missing from the configuration data file of building 10B in the system 200. In this way, the information about the building 10B in the system 200 that exists prior to the transfer remains intact, and only gaps in the information (i.e., missing information in the configuration data file of building 10B) are filled by the configuration data file of building 10A. So the transfer need not be a true "cut and paste" operation; rather, the system 200 may intelligently transfer from one building only that information that is required to fill in all the entries in the configuration data file of the other building. The configuration data file of one building (e.g., building 10B) may be an amalgam of the configuration data files of the two buildings (e.g., buildings 10A and 10B). Thus, if a particular job involves multiple buildings that are identical or at least similar to each other, the import module 220 may be used to quickly replicate configuration data (e.g., either or both of the elevator data 27 and/or the building data 29) from one building to the next as needed. The import function, as compared to manual entry, may be particularly advantageous and efficient because the themes (e.g., company colors, logo, sounds, graphics, etc.) and buttons (e.g. main lobby, alternate lobby, size and location) are also imported.

The GUI 400 may include additional buttons to allow the user to further interact with the system 200. For example, the "add building" button 514 may return the GUI 400 back to the information editor area 422, where the user may input building information 29. The "upload" button 518 may return the GUI 400 back to the real time communication area 424. The "download" button 516 may initiate the export module 221 and cause it to download the latest building and elevator information to a configuration data file as described above, which may be stored in the memory 214 of the control content system 200; the file may also be stored in the database 204, which may in embodiments act as a backup. The "edit" 520 button may allow for editing of the elevator information 27 and building information 29, e.g., to fix any errors therein. The "trash" button 522 may remove the current elevator information from the content control system 200.

As discussed above, the import operation may, in embodiments, fill in voids in the elevator data 27 and building data 29 but may not override the information therein. The error check module 226, however, may allow for data to be overridden if needed, as discussed herein. The user may depress the "check for errors" button 524 to initiate the error check module 226. The error-check module 226 may check for potential errors caused by virtue of the import operation and warn the user about same. To illustrate, consider the example above in which the configuration data file of building 10A in the system 200 was used to modify the configuration data file of the building 10B in the system 200. Assume that building 10A has ten floors but that building 10B has twenty. Assume further that the data configuration file of building 10B, after the import operation, indicates in the building data 29 that the building 10B has twenty floors but indicates in the elevator data 27 that the building 10B has ten floors (because the latter was imported from building 10A). The error-check module 226 may flag this disparity and apprise the user, e.g., via a pop-up notification or otherwise, that the configuration data file for building 10B appears to include an error with respect to the number of floors. The user may thus correct this information as needed. In some embodiments, the error-check module 226 may ensure that the portion of the configuration data flagged as having an error therein is not destructively overwritten unless the overwriting is authorized by the user.

The errors flagged by the error-check module 226 may include but are not limited to: errors in themes (i.e. company colors, logo, sounds, graphics, etc.), kiosk buttons (e.g. main lobby, alternate lobby, their size and location), floor information, elevator car information, kiosk information, walking times, walking space, and other elevator information 27. In embodiments, the identification numbers of the elevator controller, kiosk, elevator cars, etc. are not impacted by the import of the data file, so these are not reviewed by the error check module. The error check module 226 ensures that each elevator and kiosk placed onto the grid or map is uniquely identified, for example, such that a passenger walking path and time may be correctly and efficiently generated.

Figure 6:
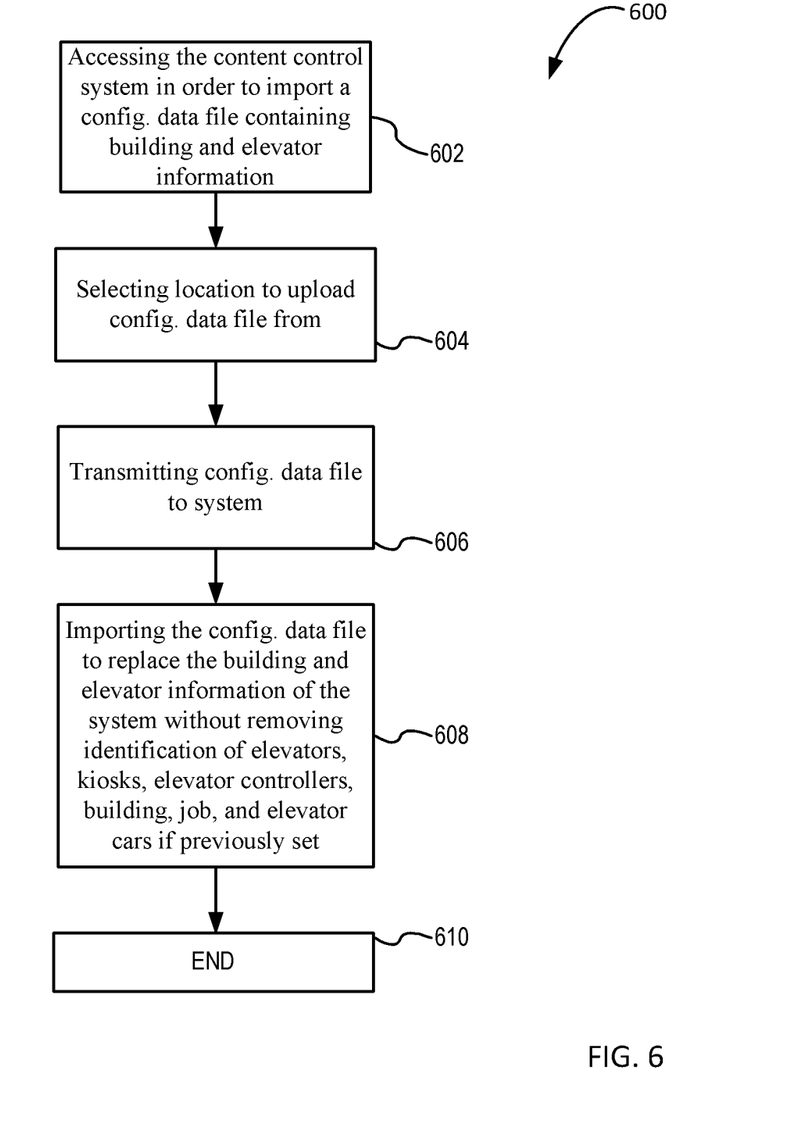
FIG. 6 is a flowchart illustrating a method of using the import/export tool of FIG. 2 to import building and elevator information from a secondary source.

Attention is directed now to FIG. 6, which shows a method 600 of importing and downloading elevator and building information from a separate system (i.e. separate building, separate elevator controller, separate job site, etc.), according to an example embodiment. Beginning at step 602, a user may access the content control system 200 on structure 202 via the GUI module 230 to import a configuration data file containing building information 29 and elevator information 27.

At step 604, the user may select a location to upload the configuration data file from. At this step, the file could be located in a specific elevator controller, in a database, a flash drive, a different content control system, etc.

At step 606, the selected configuration file may be transmitted to the structure 202. The configuration data file may be encrypted or compressed or some combination thereof.

At step 608, the configuration data file is imported to the structure 202 to fill in the gaps (or voids) in one or more other configuration data files, without removing identification numbers of elevators, kiosks, elevator controllers, buildings, jobs, and elevator cars if previously set. The method 600 may then end at step 610.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A computer-implemented method for importing data to an elevator content control system, comprising:
using a computing structure remote from a destination dispatch kiosk to execute the following steps by a processor:
selecting a location to upload a configuration data file, the configuration data file including building information and elevator information;
uploading the selected configuration data file to the content control system; and
importing only a portion of the configuration data file to the content control system, the portion being sufficient to fill in a void in the second configuration data file, the void being an absence of operational data relating to at least one item from the group consisting of themes, kiosk buttons, kiosk information, floor information, elevator car information, and walking information;
wherein, the importing does not overwrite a preset identification number for at least one of an elevator, a kiosk, an elevator controller, a building, a job, and an elevator car.

2. The computer-implemented method of claim 1, further comprising using an error-check module to identify an error in the second configuration data file.

3. The computer-implemented method of claim 2, further comprising outputting a warning in response to the identification of the error.

4. The computer-implemented method of claim 3, wherein the error is introduced by the importing of the configuration data file.

5. The computer-implemented method of claim 1, wherein the location is at least one of: an elevator controller, a database, a building controller, a portable storage medium, and a second content control system.

6. The computer-implemented method of claim 1, wherein the building information includes at least one of the following: a group name, a job name, a building name, a building address, and a corporation name.

7. The computer-implemented method of claim 1, wherein the elevator information includes at least one of the following: an elevator grouping information, a number of floors, a total number of elevator cars, a kiosk information, and a special feature.

8. The computer-implemented method of claim 7, wherein the kiosk information includes at least one of: a model of kiosk, a size of screen, a layout of buttons, a floor location, and a building map location.

9. The computer-implemented method of claim 7, wherein the special feature includes an American with Disabilities Act (ADA) capability.

10. The computer-implemented method of claim 1, wherein the imported configuration data file is each of compressed and encrypted.

11. The computer-implemented method of claim 1, wherein the data file is at least one of compressed and encrypted.

12. The computer-implemented method of claim 1, wherein the computer structure has stored within memory computer instructions for at least one of: an export module, an information editor module, a graphical user interface (GUI) module, and an Application Programming Interface (API).

13. The computer-implemented method of claim 12, wherein the information editor module allows at least one of the following to be edited: a building name, a location of a building, a number of floors in building, a company name, a job number, a default displayed language, a group name, a job number, a group number, and a number of elevator cars.

14. The computer-implemented method of claim 13, wherein the export module allows the second configuration data file to be saved in at least one of: a separate database, a local memory, and a separate portable memory.

15. The computer-implemented method of claim 12, wherein:
the GUI module allows a GUI interface to be displayed; and
the GUI interface includes at least one of: a real time communication area, an information area, and a data transfer area.

16. The computer-implemented method of claim 12, wherein the API allows for communication through a network with at least one of: a remote database, a building, and a remote elevator controller.

17. The computer-implemented method of claim 1, wherein the importing does not overwrite a preset identification number for each of an elevator, a kiosk, an elevator controller, a building, a job, and an elevator car.

18. A non-transitory computer readable medium with computer executable instructions stored thereon executed by a digital processor to perform the method of importing data to a content control system, comprising:
(a) instructions for selecting a location to upload a configuration data file containing building information and elevator information;
(b) instructions for uploading the configuration data file from the location to the content control system;
(c) instructions for recognizing a void in a second configuration file, the void being an absence of operational data relating to at least one of a set of building data, a set of kiosk data, or a set of elevator data; and
(d) instructions for importing only a portion of the configuration data file to the content control system, the portion being sufficient to fill in the void in the second configuration data file;
wherein, the importing does not overwrite a preset identification number for at least one of an elevator, a kiosk, an elevator controller, a building, a job, and an elevator car; and
wherein, the non-transitory computer readable medium is in communication through a network with a building and a remote elevator controller.

19. The non-transitory computer readable medium of claim 18, wherein the importing does not overwrite a preset identification number for each of an elevator, a kiosk, an elevator controller, a building, a job, and an elevator car.

20. The non-transitory computer readable medium of claim 18, wherein the non-transitory computer readable medium is in communication through a network with a remote database.

* * * * *